US012802850B2

(12) United States Patent
Otsubo

(10) Patent No.: US 12,802,850 B2
(45) Date of Patent: Nov. 17, 2026

(54) INDUCTOR

(71) Applicant: Panasonic Intellectual Property Management Co., Ltd., Osaka (JP)

(72) Inventor: Mutsuyasu Otsubo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 809 days.

(21) Appl. No.: 18/249,471

(22) PCT Filed: Oct. 11, 2021

(86) PCT No.: PCT/JP2021/037619
§ 371 (c)(1),
(2) Date: Apr. 18, 2023

(87) PCT Pub. No.: WO2022/091761
PCT Pub. Date: May 5, 2022

(65) Prior Publication Data

US 2023/0395294 A1 Dec. 7, 2023

(30) Foreign Application Priority Data

Oct. 30, 2020 (JP) ................................ 2020-182438

(51) Int. Cl.
*H01F 27/29* (2006.01)
*H01F 5/04* (2006.01)
(Continued)

(52) U.S. Cl.
CPC ............... *H01F 5/04* (2013.01); *H01F 27/24* (2013.01); *H01F 27/292* (2013.01); *H01F 27/306* (2013.01); *H01F 41/10* (2013.01)

(58) Field of Classification Search
CPC .. H01F 27/29; H01F 27/292; H01F 2017/048; H01F 17/04; H01F 27/2823;
(Continued)

(56) References Cited

U.S. PATENT DOCUMENTS 6,452,473 B1 * 9/2002 Suzuki ............... H01F 17/0013 336/200
2010/0026443 A1 2/2010 Yan et al.
(Continued)

FOREIGN PATENT DOCUMENTS

JP 03-112113 A 5/1991
JP 2005142459 A * 6/2005
(Continued)

OTHER PUBLICATIONS

Decision to Refuse mailed on Sep. 2, 2025 for the corresponding Japanese patent application No. 2022-558976.
(Continued)

*Primary Examiner* — Tszfung J Chan
(74) *Attorney, Agent, or Firm* — Rimon P.C.

(57) ABSTRACT

An inductor includes: a magnetic core including a magnetic material and having a three-dimensional shape and a side face; a coil element including a metallic material, an embedded portion embedded in the magnetic core, and an end portion exposed from the magnetic core and extending along the side face; and an electrode member including a metallic material, having flexibility, and disposed opposite to the magnetic core across the end portion. The electrode member includes a side face portion disposed along the side face and at least partially overlapping the end portion as viewed in a thickness direction of the side face portion. The electrode member and the magnetic core are adhered via an adhesion layer including resin that is adhesive. The electrode member and the end portion are welded together at least in a part of
(Continued)

a region in which the side face portion and the end portion overlap.

14 Claims, 8 Drawing Sheets

(51) Int. Cl.
*H01F 27/24* (2006.01)
*H01F 27/30* (2006.01)
*H01F 41/10* (2006.01)

(58) Field of Classification Search
CPC ............. H01F 27/2828; H01F 27/2804; H01F 2027/2809; H01F 17/0006; H01F 17/0013; H01F 5/003; H01F 2017/0066; H01F 27/24; H01F 5/04; H01F 27/306
USPC ..................................................... 336/83, 192
See application file for complete search history.

(56) References Cited

U.S. PATENT DOCUMENTS

| | | | | |
|---|---|---|---|---|
| 2011/0260821 | A1 | 10/2011 | Yamada et al. | |
| 2013/0154780 | A1* | 6/2013 | Yamada .................. | H01F 27/29 336/175 |
| 2015/0091685 | A1* | 4/2015 | Kitajima ............. | H01F 17/0013 29/602.1 |
| 2018/0012699 | A1 | 1/2018 | Arimitsu et al. | |
| 2019/0096568 | A1* | 3/2019 | Yoon ................... | H01F 17/0013 |
| 2019/0198226 | A1* | 6/2019 | Kawamura ............. | H01F 27/29 |
| 2020/0312528 | A1* | 10/2020 | Sato ........................ | H01F 17/04 |

FOREIGN PATENT DOCUMENTS

| | | | | | |
|---|---|---|---|---|---|
| JP | 2006-344901 | A | | 12/2006 | |
| JP | 2007273739 | A | * | 10/2007 | |
| JP | 2018-006676 | A | | 1/2011 | |
| JP | 2011-249770 | A | | 12/2011 | |
| JP | 2011-530172 | A | | 12/2011 | |
| JP | 2012174815 | A | * | 9/2012 | |
| JP | 2012-526389 | A | | 10/2012 | |
| JP | 2013-125896 | A | | 6/2013 | |
| JP | 2013191726 | A | * | 9/2013 | |
| JP | 2014-082382 | A | | 5/2014 | |
| JP | 2016-127189 | A | | 7/2016 | |
| WO | 2010/014444 | A1 | | 2/2010 | |
| WO | 2010/129352 | A1 | | 11/2010 | |
| WO | WO-2018219367 | A2 | * | 12/2018 | ............. B29C 45/02 |
| WO | WO-2019004038 | A1 | * | 1/2019 | ............. H01F 41/10 |

OTHER PUBLICATIONS

International Search Report issued on Jan. 11, 2022 in International Patent Application No. PCT/JP2021/037619, with English translation.

* cited by examiner

INDUCTOR

CROSS-REFERENCE OF RELATED APPLICATIONS

This application is the U.S. National Phase under 35 U.S.C. § 371 of International Patent Application No. PCT/JP2021/037619, filed on Oct. 11, 2021, which in turn claims the benefit of Japanese Patent Application No. 2020-182438, filed on Oct. 30, 2020, the entire disclosures of which Applications are incorporated by reference herein.

TECHNICAL FIELD

The present disclosure relates to an inductor.

BACKGROUND ART

Inductors, which are passive elements that store electric energy as magnetic energy, are used in, for example, DC-DC converters to raise and lower voltage of power supply voltage and smoothing direct current (DC). For example, a surface mount inductor that can be joined to a circuit board by a reflow method has been developed (see Patent Literature (PTL) 1, for example).

CITATION LIST

Patent Literature

[PTL 1] Japanese Unexamined Patent Application Publication No. 2011-249770

SUMMARY OF INVENTION

Technical Problem

Conventional inductors may not have reliable connections to an external circuit. In view of the above, an object of the present disclosure is to provide an inductor having higher connection reliability.

Solution to Problem

An inductor according to one aspect of the present disclosure includes: a magnetic core including a magnetic material and having a three-dimensional shape and a side face; a coil element including a metallic material and including an embedded portion and an end portion, the embedded portion being embedded in the magnetic core, the end portion exposed from the magnetic core and extending along the side face; and an electrode member disposed opposite to the magnetic core across the end portion of the coil element, the electrode member including a metallic material and having flexibility. The electrode member includes a side face portion disposed along the side face of the magnetic core, the side face portion at least partially overlapping the end portion of the coil element as viewed in a thickness direction of the side face portion, the electrode member and the magnetic core are adhered to each other via an adhesion layer including resin that is adhesive, and the electrode member and the end portion are welded together at least in a part of a region in which the side face portion and the end portion overlap each other as viewed in the thickness direction of the side face portion.

Advantageous Effects of Invention

The present disclosure can provide an inductor having higher connection reliability.

DESCRIPTION OF EMBODIMENTS

Circumstances Leading to the Present Disclosure

As described above, inductors have been used in many electronic devices in recent years. In particular, inductors are sometimes mounted on circuit boards to be used, and surface mount inductors designed to be mounted on lands on circuit boards have been developed.

Figure 1:
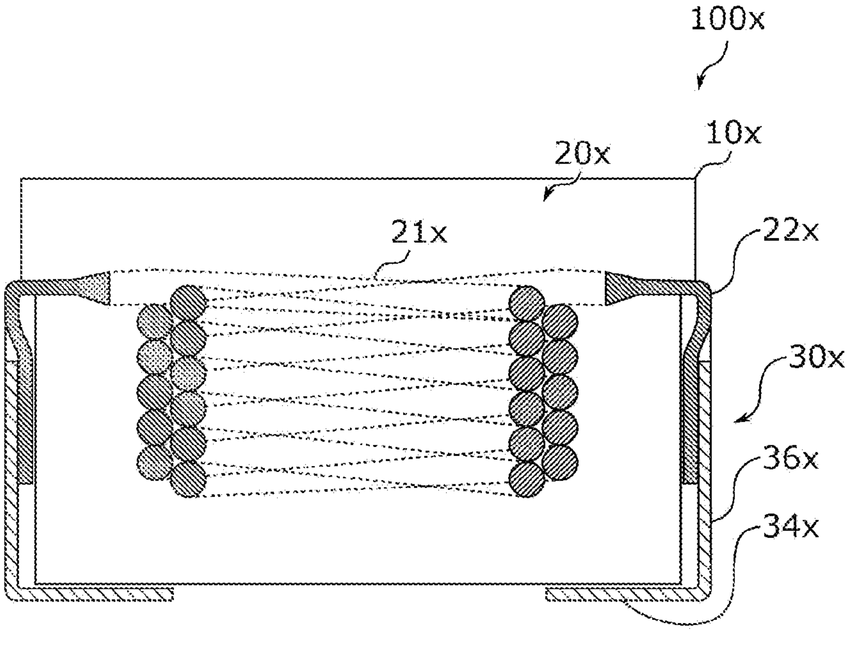
FIG. 1 is a sectional view of an inductor according to a comparison example.

For example, FIG. 1 is a sectional view of inductor 100*x*, which is a surface mount inductor, according to a comparison example. Inductor 100*x* illustrated in FIG. 1 is similar to the inductor according to PTL 1. Inductor 100*x* includes coil element 20*x*, magnetic core 10*x* surrounding coil element 20*x*, and electrode members 30*x* connected to coil element 20*x*. Coil element 20*x* includes embedded portion 21*x* embedded in magnetic core 10*x*, and end portions 22*x* each protruding outside and exposed from a corresponding one of the side faces of magnetic core 10*x*. End portion 22*x* of coil element 20*x* is bent along the side face of magnetic core 10*x* and extends toward the bottom face (the surface along the lower side of the plane of the page).

Electrode member 30*x* is disposed on the side face of magnetic core 10*x* to overlap the outer side of end portion 22*x* of coil element 20*x*, and is bent along the bottom face of magnetic core 10*x*. Electrode member 30*x* and end portion 22*x* are joined by a joining material, which is not illustrated. Here, end portion 22*x* and electrode member 30*x* are joined together by the joining material before being bent along the bottom face of magnetic core 10*x*. After being joined, end portion 22 and electrode member 30*x* are bent along the bottom face of magnetic core 10*x*.

With this configuration, after end portion 22*x* and electrode member 30*x* are bent, it is impossible to visually check the condition of the joining part because of electrode member 30*x* on the outer side. Therefore, it may not be possible to detect anomalies in the bonding conditions, such as a shortage of the joining material, or a crack occurred in the joining part during the bending process or the joint part being dislodged due to the shortage of the joining material.

If there is such an anomaly in the joining part between coil element 20$x$ and electrode member 30$x$ when inductor 100$x$ is used, it is predicted that malfunctions may occur, for example, the expected performance may not be achieved due to insufficient power supply to coil element 20$x$, and the electric resistance in the joining part may rise and abnormal heat generation may occur.

Moreover, in inductor 100$x$, a gap may be formed between magnetic core 10$x$ and end portion 22$x$ of coil element 20$x$, as illustrated in the figure. In addition, a gap may also be formed between magnetic core 10$x$ and electrode member 30$x$, which is joined to end portion 22$x$ of coil element 20$x$ via a joining material. Therefore, even when end portion 22$x$ and electrode member 30$x$ are bent along magnetic core 10, strictly speaking, gaps are formed between magnetic core 10$x$ and end portion 22$x$, and between magnetic core 10$x$ and electrode member 30$x$. Inductor 100$x$ has a structure in which magnetic core 10$x$ is "suspended" as viewed from the circuit board on which inductor 100$x$ is mounted.

Inductor 100$x$ may be subjected to vibration due to traveling depending on the use environment, such as being provided in a vehicle. Therefore, magnetic core 10$x$ suspended above the circuit board may swing like a pendulum due to vibration. At this time, vibrational stress is concentrated at the connection parts between (i) end portion 22$x$ supporting magnetic core 10$x$ and side plate 36$x$ along end portion 22$x$, and between (ii) bottom plate 34$x$ bent under magnetic core 10$x$ and side plate 36$x$ (i.e., the bending part of electrode member 30$x$). Damage (fracture) may occur at these parts.

In view of the above, the present disclosure describes an inductor having higher connection reliability. Specifically, an inductor according to the present disclosure includes: a magnetic core including a magnetic material and having a three-dimensional shape and a side face; a coil element including a metallic material and including an embedded portion and an end portion, the embedded portion being embedded in the magnetic core, the end portion exposed from the magnetic core and extending along the side face; and an electrode member disposed opposite to the magnetic core across the end portion of the coil element, the electrode member including a metallic material and having flexibility. The electrode member includes a side face portion disposed along the side face of the magnetic core, the side face portion at least partially overlapping the end portion of the coil element as viewed in a thickness direction of the side face portion, the electrode member and the magnetic core are adhered to each other via an adhesion layer including resin that is adhesive, and the electrode member and the end portion are welded together at least in a part of a region in which the side face portion and the end portion overlap each other as viewed in the thickness direction of the side face portion.

The electrode member having flexibility can be bent along the shape of the magnetic core and the shape of the end portion of the inductor. With this, the electrode member and the end portion of the coil element can be stably welded together. Since this welding is performed after the electrode member is overlapped on the end portion, it is possible to check the appropriateness of the welding after manufacturing, for example, by checking a weld mark.

Moreover, for example, the electrode member and the end portion are adhered to each other after the end portion is bent and then the electrode member is overlapped on the end portion. With this, there is no load on the joining material due to changes in the positional relation between the end portion and the electrode member due to differences between the flexible properties at the time of bending, compared with when the end portion and the electrode member are bent at the same time.

Moreover, since the electrode member is adhered to and held by the magnetic core, which is a main portion in terms of weight, in the inductor after being mounted, the magnetic core and the electrode member behave like one piece in which the magnetic core and the electrode member are integrated. In particular, since the electrode member used in the present disclosure has flexibility, the electrode member extends along the shape of the magnetic core as described above and has a shape similar to the shape of the outer surface of the magnetic core. As a result, the adhesion layer that bonds the electrode member and the magnetic core can be made thin, and therefore the magnetic core and the electrode member can be more highly integrated with each other. For example, even when the inductor is to be affected by vibration due to traveling when the inductor is provided in a vehicle, the magnetic core and the electrode member of the inductor move integrally relative to the circuit board on which the electrode member is mounted. With this, damage to each component caused by concentration of vibrational stress can be inhibited. In this way, higher connection reliability is ensured in the inductor according to the present disclosure.

The following specifically describes embodiments with reference to the drawings.

Note that the embodiments described below each shows a specific example of the present disclosure. The numerical values, shapes, materials, structural elements, the arrangement and connection of the structural elements, steps, the order of the steps, etc. mentioned in the following embodiments are mere examples and not intended to limit the present disclosure. Among the structural elements in the following embodiments, structural elements not recited in any one of the independent claims are described as optional structural elements.

Each figure shows the X, Y, and Z axes, which mean three directions orthogonal to each other, and these axes and the directions along those axes are used for explanation, as necessary. In the following description, the Z-axis direction may also be referred to as a first direction and the X-axis direction may also be referred to as a second direction. Note that each axis is shown for illustrative purposes only and does not limit the direction and orientation in which an inductor is used.

EMBODIMENT

Configuration

Figure 2:
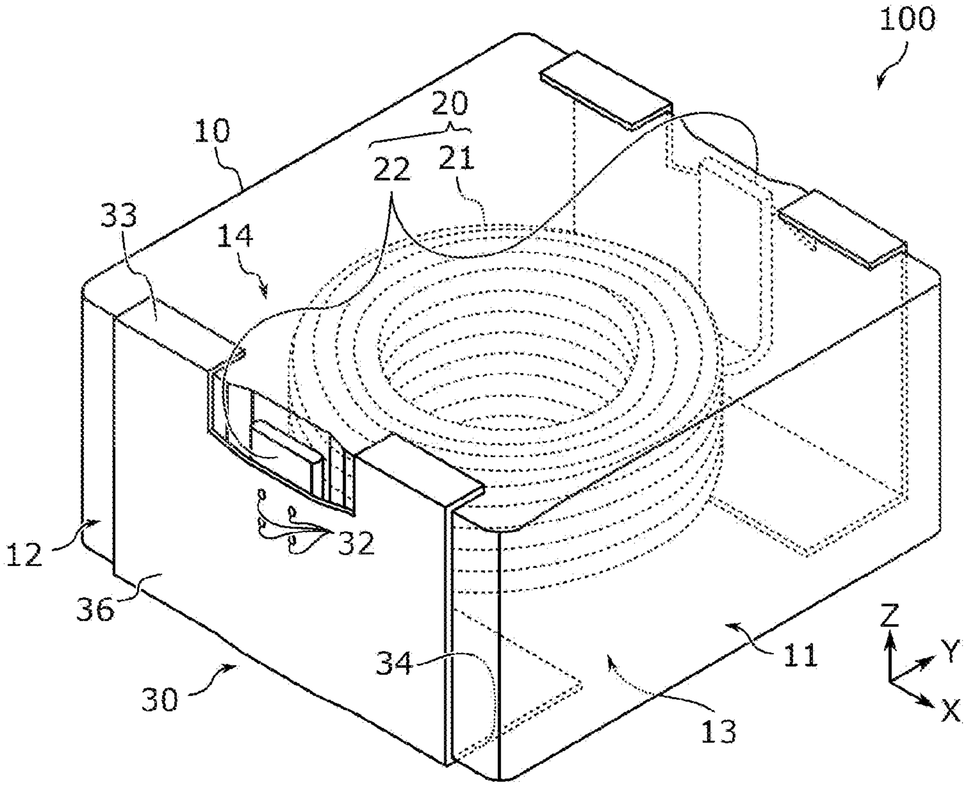
FIG. 2 is a perspective view of an inductor according to an embodiment.

An inductor according to an embodiment with reference to FIGS. 2 to 8 will be described. FIG. 2 is a perspective view of an inductor according to the embodiment. In FIG. 2, the configuration that can be seen from outside of inductor 100 according to the embodiment is illustrated with solid lines. Moreover, in FIG. 2, the configuration that can be seen when magnetic core 10 of inductor 100 is transparent is illustrated with dashed lines.

Figure 3:
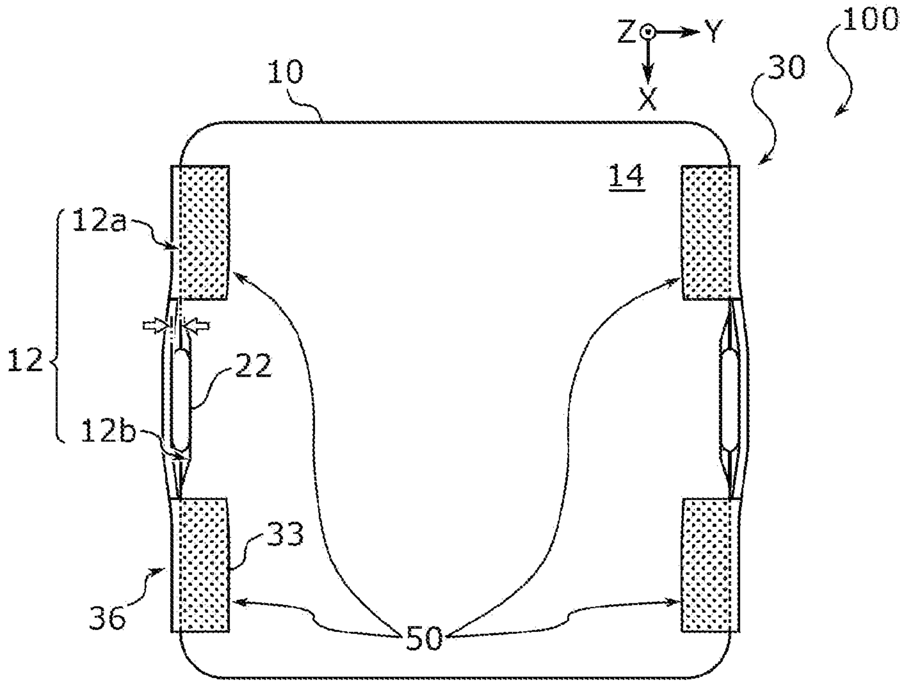
FIG. 3 is a plan view of the inductor according to the embodiment as viewed from the top face side.
Figure 4:
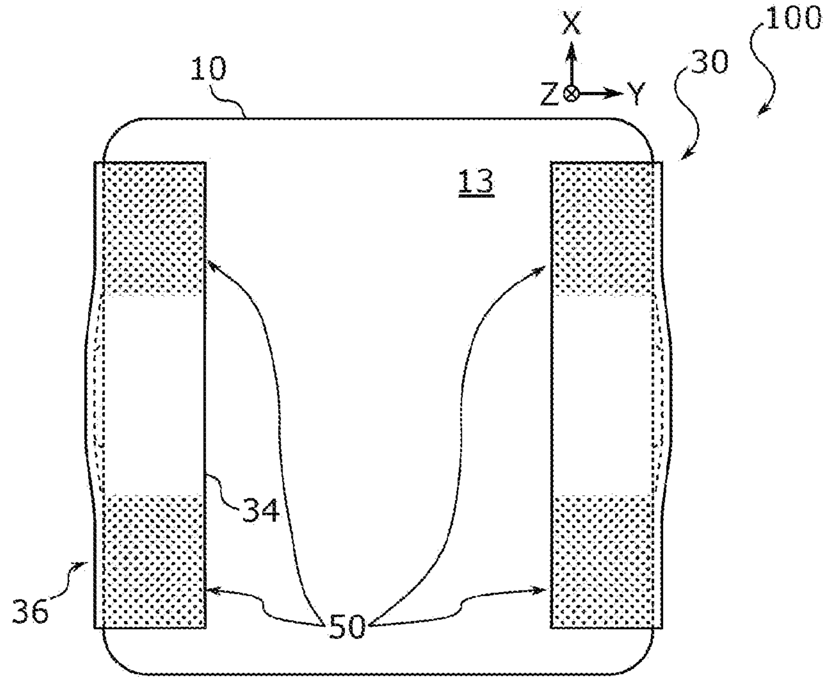
FIG. 4 is a plan view of the inductor according to the embodiment as viewed from the bottom face side.
Figure 5:
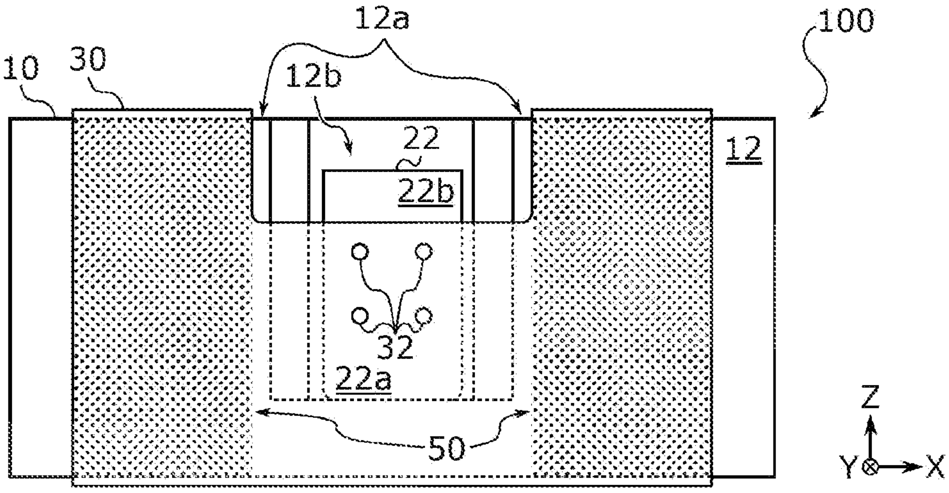
FIG. 5 is a plan view of the inductor according to the embodiment as viewed from a side face side.

FIG. 3 is a plan view of the inductor according to the embodiment as viewed from the top face side. Moreover, FIG. 4 is a plan view of the inductor according to the embodiment as viewed from the bottom face side. FIG. 5 is a plan view of the inductor according to the embodiment as viewed from a side face side.

In FIGS. 3, 4, and 5, adhesive 50 that can be seen when electrode material 30 is transparent is illustrated with dot hatching. Moreover, in FIGS. 3, 4, and 5, the configuration of each part that can be seen when electrode member 30 is transparent is illustrated with dashed lines.

As illustrated in FIG. 2, inductor 100 according to the embodiment includes magnetic core 10, coil element 20, and electrode member 30.

As an example, inductor 100 includes a rectangular parallelepiped powder magnetic core, and the approximate outline is determined by the shape of magnetic core 10. Note that magnetic core 10 can be formed into any shape by molding. In other words, inductor 100 having any shape can be produced based on the shape of magnetic core 10 at the time of molding. Inductor 100 according to the present embodiment includes magnetic core 10. Magnetic core 10 has a dimension in the X-axis direction of at least 4 mm and at most 12 mm, a dimension in the Y-axis direction of at least 4 mm and at most 12 mm, and a dimension in the Z-axis direction of at least 2 mm and at most 8 mm.

Magnetic core 10 is the outer shell of inductor 100 and partially covers coil element 20. Magnetic core 10 is, for example, a powder magnetic core including metal magnetic powder and resin material, for example. Note that magnetic core 10 may be formed using any magnetic materials. For example, ferrite or other materials may be used. As the metal magnetic powder, particulate material having a predetermined elemental composition may be used, such as Fe—Si—Al-based, Fe—Si-based, Fe—Si—Cr-based, or Fe—Si—Cr—B-based particulate material. As the resin material, a material such as silicone that can maintain a certain shape by insulating the particles of metal magnetic powder while bonding the particles together is selected.

Magnetic core 10 is, for example, a rectangular parallelepiped shape having bottom face 13, four side faces connected to bottom face 13, and top face 14 connected to the four side faces and opposed to bottom face 13. The four side faces are made up of two side faces 11 that are opposed to each other in the X-axis direction and two side faces 12 that are opposed to each other in the Y-axis direction. Each of the four side faces 11 and 12 has a flat face perpendicular to bottom face 13. Note that, in side face 12, recess 12*b* that is recessed toward the inside of magnetic core 10 is formed as illustrated in FIG. 3. This recess 12*b* houses end portion 22 of coil element 20, which will be described later. A portion of the side face excluding recess 12*b* is referred to as base 12*a*.

Coil element 20 includes embedded portion 21 and a plurality of end portions 22 connected to embedded portion 21. Coil element 20 according to the present embodiment includes one embedded portion 21 and two end portions 22. Coil element 20 is produced, for example, with a material selected from (i) a metallic material, such as aluminum, copper, silver, and gold, and (ii) an alloy including metal and other materials. Embedded portion 21 and end portion 22 are the names given to each portion formed by processing one member including the same material.

Each end portion 22 is a portion not covered by magnetic core 10 and exposed from side face 12 of magnetic core 10. End portion 22 is stretched to be a flat plate shape and extends along side face 12 toward top face 14 (i.e., in the Z-axis direction) and ends before reaching top face 14. In other words, end portion 22 is a portion of coil element 20 disposed on side face 12. Since end portion 22 of coil element 20 is configured without protruding from side face 12 of magnetic core 10, for example, without protruding to the positive side of the Z-axis direction, inductor 100 can be configured compact and unintended contact with an external electronic conductive member is inhibited.

Embedded portion 21 is a portion covered by magnetic core 10. Embedded portion 21 is formed by winding an elongated material and functions as a coil. The number of turns for embedded portion 21 may be any number and is appropriately selected according to the constraints such as the performance required for inductor 100 and the size of magnetic core 10. For example, the number of turns may be 0.5 turns, 10 turns, or 100 turns. Embedded portion 21 is formed, for example, by bending a copper wire covered by an insulation film. The section of the copper wire included in embedded portion 21 has a circular shape having a diameter of from 0.16 mm to 1.40 mm for example, and the aspect ratio of the section (transverse cross section) of the copper wire is 1:1.

Embedded portion 21 is arranged such that the winding axis around which embedded portion 21 is wound is in the Z-axis direction. Embedded portion 21 includes a curved portion formed by winding and straight portions connecting the curved portion and end portions 22 described above. Each of the straight portions of embedded portion 21 extends in the Y-axis direction toward a corresponding one of side faces 12 of magnetic core 10, where end portion 22 is disposed, and is connected to end portion 22.

Electrode member 30 includes side face portion 36, bottom face portion 34, and top face portion 33. Electrode member 30 is produced, for example, with a material selected from (i) a metallic material such as aluminum, copper, silver, and gold, and (ii) an alloy including metal and other materials. For example, for inductor 100 according to the present embodiment, electrode member 30 including copper or a copper alloy is selected.

Electrode member 30 is configured to have flexibility. For example, electrode member 30 is produced with a foil material having a thickness of at least 20 μm and less than 100 μm. Electrode member 30 having flexibility can be bend along the surface of end portion 22 and the surface of magnetic core 10.

As a result, electrode member 30 is integrated with the surface of magnetic core 10. For example, when inductor 100 is vibrated, magnetic core 10 and electrode member 30 of inductor 100 can integrally move relative to circuit board 99 (see FIG. 7, which will be described later) on which electrode member 30 is mounted. Therefore, it is possible to inhibit occurrence of a crack in (i) a part between electrode member 30 which is fixed to circuit board 99 at the time of mounting and the main portions (magnetic core 10 and embedded portion 21) in terms of weight of inductor 100, and (ii) a part between electrode member 30 and end portion 22. In this way, inductor 100 can have high connection reliability. Note that, the flexibility that electrode member 30 has is a property as follows: When side face portion 36 of electrode member 30 is pressed against side face 12 of magnetic core 10 and end portion 22, electrode member 30 can plastically deform corresponding to the surface of side face 12 of magnetic core 10 and the surface of end portion 22 without deforming end portion 22. In addition, when electrode member 30 is adhered to magnetic core 10 via adhesive 50, which will be described later, the shape of electrode member 30 can be maintained based on holding force of adhesive 50 after adhesive 50 hardens. In other words, electrode member 30 having flexibility means as follows: When side face portion 36, top face portion 33, and bottom face portion 34 are formed by bending, reaction force of bending is stronger than the holding force of adhesive 50 and the parallel relation between the principal face of side face portion 36 and side face 12, the parallel relation between the principal face of top face portion 33 and top face 14, and the parallel relation between the principal face of bottom face portion 34 and bottom face 13 are not substantially ruined.

Electrode member 30 is provided on each side of inductor 100 in the Y-axis direction so that one electrode member 30 is provided to a corresponding one of two end portions 22. Here, although one of the two electrode members 30 is described, the two electrode members 30 have the same configuration and the same description is applied to the other one of the two electrode members 30. Side face portion 36, bottom face portion 34, and top face portion 33 are the names given to each portion formed by processing one member including the same material.

Side face portion 36 is a portion provided to a corresponding one of side faces 12 of magnetic core 10 to extend along the corresponding side face 12. Side face portion 36 is disposed to overlap end portion 22 of coil element 20 and fixed to end portion 22 by joining, which will be described later. Side face portion 36 is configured such that a part overlapping end portion 22 absorbs the thickness of end portion 22, so that a part not overlapping end portion 22 is located opposite to side face 12 of magnetic core 10.

More specifically, side face portion 36 includes a first region in which end portion 22 of coil element 20 is not interposed between side face portion 36 and side face 12 of magnetic core 10, and side face portion 36 and side face 12 are located opposite to each other. The first region corresponds to base 12*a*, for example. Moreover, side face portion 36 includes a second region different from the first region. In the second region, side face portion 36 and side face 12 are located opposite to each other via end portion 22 of coil element 20. The second region corresponds to recess 12*b*. Therefore, the second region of side face portion 36 is located opposite to end portion 22 of coil element 20 housed in recess 12*b*. The second region is disposed at a position shifted from the first region in a direction away from side face 12, and the first region and the second region form an electrode recess that is recessed in a direction away from side face 12.

A first part of (thickness of the stretched) end portion 22 of coil element 20 in the Y-axis direction is housed in recess 12*b*, and a second part of end portion 22 protrudes in a direction away from magnetic core 10 to a distance farther than base 12*a* by at least 5.00 μm and at most 100 μm, as viewed in the Z-axis direction (direction perpendicular to the thickness direction of side face portion 36). Electrode member 30 is disposed to cover the protruded portion. Therefore, bringing the first region of electrode member 30 into contact with base 12*a* makes it possible to naturally form the electrode recess together with the flexible property of electrode member 30.

As illustrated in FIG. 3, the electrode recess according to the present embodiment is formed by the second region sandwiched between two first regions in the X-axis direction, and the electrode recess and recess 12*b* house end portion 22 of coil element 20. Specifically, electrode member 30 is disposed such that end portion 22 is in contact with the surface of the second region closer to the magnetic core 10 (hereinafter, also referred to as the bottom of the electrode recess). The depth of electrode recess (dimension of the internal space in the Y-axis direction) corresponds to, for example, the thickness of electrode recess 22 protruding more outward than base 12*a* as shown by open arrows in the figure. For example, the depth of the electrode recess is at least 5.00 μm and at most 100 μm. Accordingly, a necessary minimum electrode recess is formed according to end portion 22 protruding outward, and therefore a compact inductor 100 can be achieved.

Figure 6:
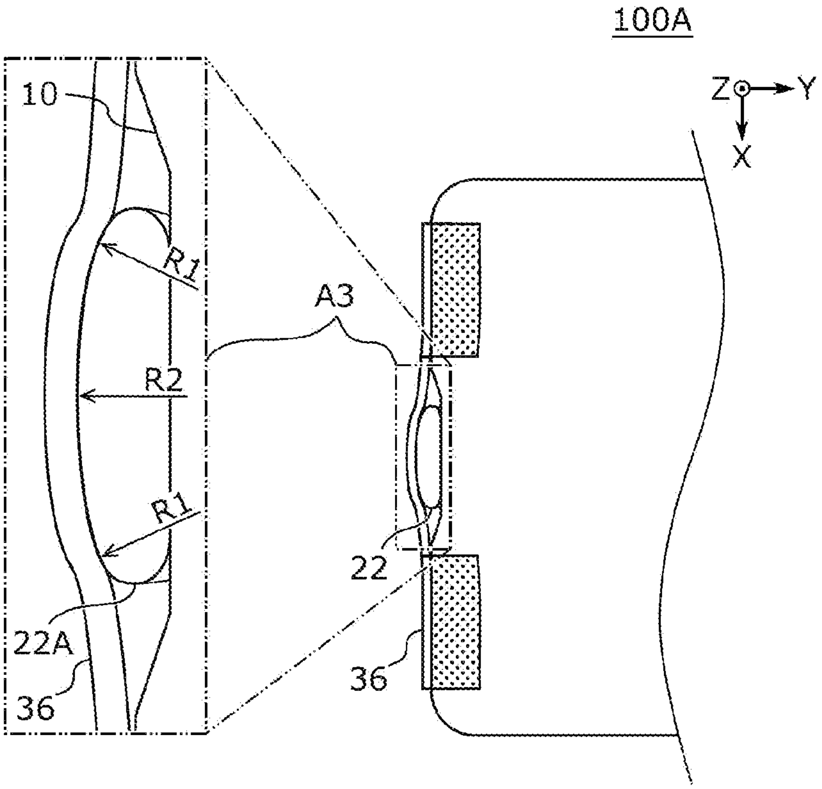
FIG. 6 is a plan view of an inductor according to another example of the embodiment as viewed from the top face side.

Note that in FIG. 3, an example has been described in which end portion 22 of coil element 20 is extended to be a flat plate shape and has a flat shape (i.e., having a flat face) in which points at which the distance from magnetic core 10 is farthest are continuous over a plurality of locations in the second part protruding to a position farther than base 12*a* in a direction away from magnetic core 10, as viewed in the Z-axis direction (direction perpendicular to the thickness direction of side face portion 36). However, the present disclosure is not limited to this example. For example, the end portion may have a curved shape (i.e., curved surface) as viewed in the Z-axis direction, instead of the flat face described above. An example will be described with reference to FIG. 6. FIG. 6 is a plan view of an inductor according to another example of the embodiment as viewed from the top face side. FIG. 6 illustrates inductor 100A according to another example as viewed in the same direction as in FIG. 3 (plan view as viewed in the direction of the Z-axis direction perpendicular to the thickness direction of side face portion 36), and an enlarged plan view of region A3 around end portion 22A. Note that a part of illustration in the positive side of the Y-axis direction is omitted in the plan view in the figure. Moreover, in the plan view and the enlarged plan view, corners corresponding to region A3 are connected and shown by two-dot chain lines.

As illustrated in the enlarged plan view of FIG. 6 as viewed from the top face 14 side of inductor 100A according to another example of the present embodiment, end portion 22A of coil element 20 may have a curved face that curves continuously (smoothly) in a direction in which the second part of end portion 22A protrudes in a direction away from magnetic core 10 as viewed in the Z-axis direction (the direction perpendicular to the thickness direction of side face portion 36). In this case, in the plan view from the Z-axis direction, the second part includes only one point at which the distance from magnetic core 10 is the farthest at the tip of the protrusion. As illustrated in the figure, in the plan view described above, the face of end portion 22A in the negative side of the Y-axis direction has a curved shape that protrudes such that the distance from magnetic core 10 increases from both end portions in the width direction (X-axis direction) toward the middle part in the width direction. End portion 22A in this example includes the curved face in the Z-axis direction, which continuously curves as described above, and is in contact with side face portion 36 at the curved face.

With this, when side face portion 36 is pressed against end portion 22A to dispose side face portion 36 on side face 12, a void is less likely to be formed between side face portion 36 and end portion 22A. Therefore, this makes it easier to bring electrode member 30 and the entirety of the curved face of the second part of end portion 22A into surface contact with each other.

Furthermore, a radius of curvature in the second part of the curved shape decreases with increasing distance along the curved shape from a position of the tip of the protrusion at which a distance from magnetic core 10 is farthest. Specifically, in the curved shape of the second part in the plan view, radius of curvature R1 of each of both parts of the second part in the width direction is smaller than radius of curvature R2 of the middle part of the second part in the width direction, i.e., the tip portion of the protrusion at which the distance from magnetic core 10 is the farthest in the thickness direction of end portion 22A. The radius of curvature gradually changes from radius of curvature R1 to radius of curvature R2 along the curved shape. Stated differently, the second part in this example includes a curved face having a curvature that gradually increases from the middle part to the both end parts in the width direction.

With this, when end portion 22A is pressed against side face portion 36, the stress at which side face portion 36 plastically deforms is greater at two parts each corresponding to a different one of both end portions of the second part in the width direction, the both end portions having a smaller radius of curvature, than the part corresponding to the tip part of the protrusion of the second part having a larger radius of curvature. With this, side face portion 36 brought in close contact with end portion 22A as if side face portion 36 is pulled between two parts corresponding to both end parts of the second part in the width direction and side face portion 36 is drawn toward the curved face of end portion 22A around the part corresponding to the tip portion of the protrusion of the second part. Therefore, side face portion 36 can be brought into surface contact with the curved face of end portion 22A more strongly. Side face portion 36 that is in surface contact with the curved face of the second part plastically deforms with both sides of the parts corresponding to the tip portion of the protrusion of the second part having a larger radius of curvature being sandwiched by both end portions of the second part having a smaller radius of curvature. Therefore, the stress that retains the state when side face portion 36 is in close contact with the curved face of the second part is generated between the second part and side face portion 36, and the surface contact state can be stably maintained.

Consequently, side face portion 36 can be easily brought into surface contact with end portion 22A. Therefore, when side face portion 36 and end portion 22A are joined to each other, which will be described later, accuracy of the joining can be increased (side face portion 36 and end portion 22A can be joined to each other stably). Therefore, reliability of electric connection at the joining part of inductor 100A can be ensured. This example can provide inductor 100A having higher connection reliability, as described above.

As illustrated in FIG. 5, adhesive 50 is applied to the principal face closer to magnetic core 10 of electrode member 30 and corresponding to the first region. As adhesive 50, for example, adhesive resin such as thermosetting epoxy resin or thermosetting silicone resin may be used.

Adhesive 50 is present between electrode member 30 and magnetic core 10, and bonds electrode member 30 and magnetic core 10. As illustrated in the figure, adhesive 50 is applied to regions that broadly cover the surface of electrode member 30 and the surface of magnetic core 10 that face each other. For example, on side face portion 36, adhesive 50 is provided in a range of 50% to 80% of the whole surface area of side face 12. In the figure, adhesive 50 is not provided to the portion corresponding to the second region, which is the middle portion in the X-axis direction. The portion to which the adhesive is not applied will be described later in detail.

In the present embodiment, the gap between electrode member 30 and magnetic core 10 is very small due to the flexibility of electrode member 30. Therefore, adhesion layer 30*c* (see FIG. 8), which will be described later, can be made thin, and thus electrode member 30 and magnetic core 10 can be more highly joined together.

In the present embodiment, adhesive 50 is applied to portions corresponding to the first regions among side face portion 36 opposite to side face 12. As illustrated in FIG. 3 and FIG. 4, adhesive 50 is also applied to (i) between the principal face of top face portion 33 closer to magnetic core 10 and top face 14 of magnetic core 10 opposite to the principal face of top face portion 33 and (ii) between the principal face of bottom face portion 34 closer to magnetic core 10 and parts of bottom face 13 opposite to the principal face of bottom face portion 34 (parts corresponding to the first regions of side face portion 36). Since electrode member 30 and magnetic core 10 are adhered to each other over a wide area in the above-described manner, the possibility that electrode member 30 would be detached from magnetic core 10 is reduced. Therefore, connection reliability improves between electrode member 30 and coil element 20, which is partially embedded in and fixed to magnetic core 10.

In side face portion 36, welded portion 32 that joins side face portion 36 and end portion 22 of coil element 20 is formed. More specifically, welded portion 32 is formed by integrating end portion 22 and side face portion 36 with each other. In other words, welded portion 32 can be regarded as a part of side face portion 36 or a part of end portion 22.

Welded portion 32 is formed by, for example, preforming welding from outside of side face portion 36 in a region in which end portion 22 and side face portion 36 are overlapped with each other by, for example, lap joint laser welding. Welding end portion 22 and side face portion 36 together will be described later in detail. As described above, welded portion 32 is formed in overlapping portion 22*a*, which is a portion of end portion 22 that overlaps side face portion 36. For example, as illustrated in FIG. 5, as viewed in the thickness direction of the side face portion (Y-axis direction), end portion 22 and side face portion 36 overlap each other in overlapping portion 22*a*, and welded portions 32 are formed in a region corresponding to overlapping portion 22*a*. In contrast, end portion 22 includes non-overlapping portion 22*b* that does not overlap side face portion 36.

Non-overlapping portion 22*b* is exposed from side face portion 36 as viewed in the thickness direction of side face portion 36. Therefore, non-overlapping portion 22*b* can be used to estimate the position where overlapping portion 22*a* is located. For example, overlapping portion 22*a* is estimated to be present in an area defined by connecting, with straight lines, (i) a connection part at which end portion 22 is connected to embedded portion 21, which is designed to be positioned at a predetermined distance away from the end of side face 12 of magnetic core 10 and (ii) non-overlapping portion 22*b*. Therefore, the position where end portion 22 and side face portion 36 overlaps each other can be accurately determined to perform welding, and thus the reliability of welding can be improved. Consequently, inductor 100 having higher connection reliability can be manufactured.

Moreover, by estimating the position of overlapping portion 22*a* in the same manner described above after welding, a false welded portion that is formed in a region not corresponding to overlapping portion 22*a* can be identified among the plurality of welded portions 32. In such cases, measures can be taken to address the false welded portion, for example, a new welded portion 32 is separately formed instead of the identified false welded portion or inductor 100 having the false welded portion can be discarded. Providing non-overlapping portion 22*b* as described above makes it possible to provide inductor 100 having higher connection reliability.

Note that coil element 20 is formed using a copper wire covered with an insulation film, but the insulation film is removed in the part where welded portion 32 is to be formed. Welding for forming welded portion 32 is performed in the uncovered portion where the copper wire is not covered as described above. In general welding, two base materials to be used for welding is heated to a high temperature to be melted. The base materials mix each other and hardened, and fixed to each other. At this time, if an organic material such as the insulation film is present, the organic material would gasify and interfere with mixing of base materials, for example. This may cause a welding error. Therefore, occurrence of a welding error can be inhibited by forming welded portion 32 in the uncovered portion where the insulation film is removed. With this, inductor 100 having high connection reliability can be produced.

Here, a plurality of welded portions 32 may be formed as described above. For example, in inductor 100 according to the present embodiment, four welded portions are formed per electrode member 30. Therefore, there are eight welded portions in total for two electrode members 30. By forming a plurality of welded portions 32, inductor 100 functions normally as long as electrode members 30 and end portions 22 are joined to each other at some of welded portions 32 among the plurality of welded portions 32. Stated differently, this makes it possible to produce inductor 100 that functions normally even if welding errors occur at some of welded portions 32.

Bottom face portion 34 is a portion provided corresponding to bottom face 13 of magnetic core 10. Bottom face portion 34 is integrated with side face portion 36 at a position corresponding to the border between side face 12 and bottom face 13 of magnetic core 10. Bottom face portion 34 is provided to extend in the central direction of magnetic core 10 along bottom face 13. Moreover, top face portion 33 is a portion provided corresponding to top face 14 of magnetic core 10. Top face portion 33 is integrated with side face portion 36 at a position corresponding to the border between side face 12 and top face 14 of magnetic core 10. Top face portion 33 is provided to extend in the central direction of magnetic core 10 along top face 14. Top face portion 33 corresponds to the first region of side face portion 36, and extends from each of two first regions sandwiching the second region of side face portion 36 along the top face. Accordingly, top face portion 33 includes two parts which are separated due to removal of the middle portion in the X-axis direction. Note that, this configuration does not interfere with magnetic flux inside magnetic core 10 compared with the case where top face portion 33 is not provided and a protruded portion that protrudes from electrode member 30 is inserted to a part of magnetic core 10 to be fixed. Therefore, inductor 100 that is magnetically advantageous can be provided.

Figure 7:
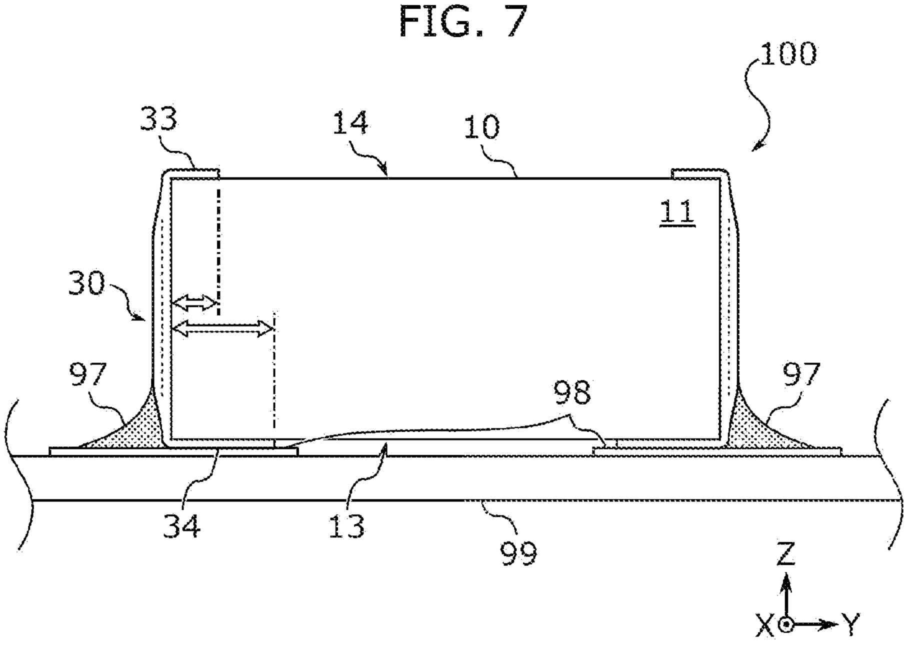
FIG. 7 is a diagram illustrating an example of mounting the inductor according to the embodiment.

FIG. 7 is a diagram illustrating an example of mounting the inductor according to the embodiment. FIG. 7 illustrates how inductor 100 is mounted on circuit board 99 as viewed in the X-axis direction. For example, as illustrated in FIG. 7, when inductor 100 is mounted on circuit board 99, each bottom face portion 34 is connected to land 98 on circuit board 99 via joining material 97, such as solder.

At this time, a fillet is formed on each side face portion 36 by joining material 97 used for connecting to land 98. As described above, inductor 100 according to the present embodiment does not use the joining material for electrically connecting electrode member 30 and end portion 22. Therefore, for example, another joining material will not be mixed from the inductor 100 side to joining material 97 for connecting inductor 100 to land 98 when inductor 100 is mounted on circuit board 99. In other words, inductor 100 can be mounted without changing the properties of joining material 97. Joining material 97 is appropriately selected according to applications of inductor 100. Therefore, by not changing the properties of joining material 97, it is possible to provide inductor 100 that can exhibit performance in accordance with the specification. Here, when inductor 100 is mounted on circuit board 99, top face 14 needs to be sucked by a nozzle to move inductor 100 to the position of a predetermined land 98 on circuit board 99.

When top face portion 33 is provided on top face 14, there is a difference in level between the principal face of top face portion 33 in the positive side of the Z-axis direction and top face 14. On the other hand, since a flat face for being sucked by a nozzle as described above needs to be secured, for example, the surface area of the principal face of top face portion 33 along top face 14 is designed to be smaller than the surface area of the principal face of bottom face portion 34 along bottom face 13. With this, a wide flat face can be secured for being sucked by a nozzle at the time of mounting inductor 100, and various suction nozzles can be used for mounting inductor 100.

For the above purpose, for example, as illustrated with open double-headed arrows in FIG. 7, the length of top face portion 33 is shorter than the length of bottom face portion 34 in the Y-axis direction. Moreover, as illustrated in FIG. 3 and FIG. 4, in the X-axis direction, the length between both ends of top face portion 33 is substantially the same as the length of bottom face portion 34. However, top face portion 33 has a shape in which the middle portion in the X-axis direction is removed. For example, when a part of a suction nozzle that sucks top face 14 is circular, the surface area of the effective flat surface can be increased by removing the middle portion in the X-axis direction. Accordingly, by designing the surface area of the principal face of top face portion 33 along top face 14 to be smaller than the surface area of the principal face of bottom face portion 34 along bottom face 13, more various suction nozzles can be used for mounting inductor 100.

Moreover, top face portion 33 inhibits detaching of magnetic core 10 from electrode member 30 in the positive side of the Z-axis direction. More specifically, for example, side face portion 36 is not sufficiently adhered by adhesive 50, magnetic core 10 can move in the Z-axis direction relative to electrode member 30. At this time, presence of top face portion 33 can suppress magnetic core 10 from the positive side of the Z-axis direction. Therefore, for example, when magnetic core 10 is vibrated, detaching of magnetic core 10 from electrode member 30 in the positive side of the Z-axis direction can be inhibited. Moreover, in inductor 100 according to the present embodiment, one electrode member 30 includes top face portion 33 which is separated into two parts, and two electrode members 30 press inductor 100 having a rectangular parallelepiped shape at four corners of top face 14. This configuration has a higher effect of inhibiting detachment of magnetic core 10.

Figure 8:
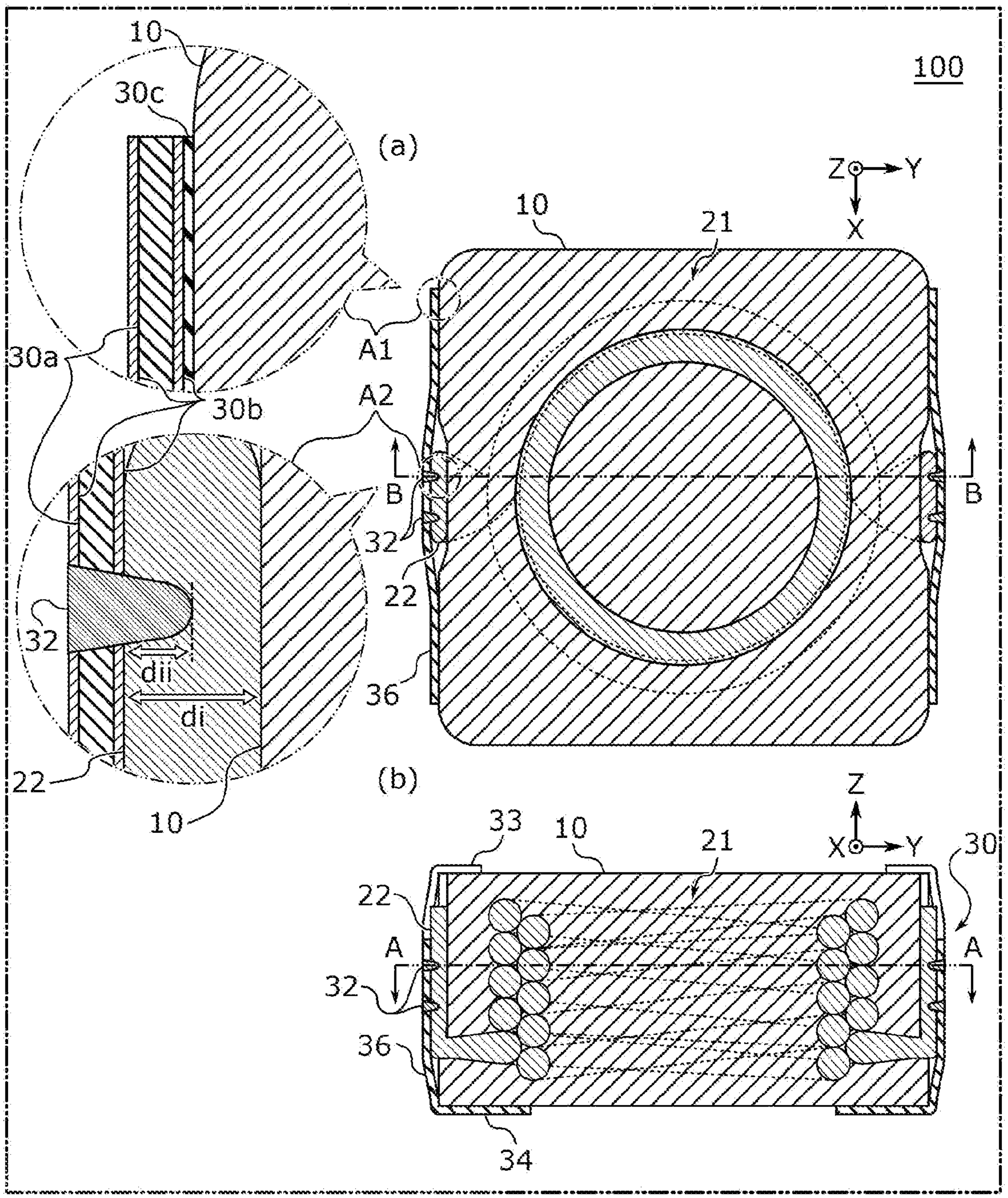
FIG. 8 is a sectional view of the inductor according to the embodiment.

FIG. 8 is a sectional view of the inductor according to the embodiment. In FIG. 8, (a) is a sectional view when inductor 100 is cut along section A-A illustrated in (b) in FIG. 8. Moreover, (b) in FIG. 8 is a sectional view when inductor 100 is cut along section B-B illustrated in (a) in FIG. 8. Moreover, in the sectional view in (a) in FIG. 8, an enlarged sectional view of region A1 and an enlarged sectional view of region A2 are also illustrated.

As illustrated in (a) and (b) in FIG. 8, side face portion 36 is attached to side face 12 of magnetic core 10. Moreover, electrode member 30 including side face portion 36 is physically and electrically connected to end portion 22 of coil element 20 via welded portion 32.

As illustrated in the enlarged sectional view of region A1, electrode member 30 includes electrode layer 30*a*, plating layers 30*b* formed on the surfaces of electrode member 30 to cover electrode layer 30*a* and adhesion layer 30*c*. Electrode layer 30*a* is a main part of electrode member 30, and is a foil material of copper or a copper alloy. Plating layers 30*b* include tin or solder, and the boundary portions between electrode layer 30*a* and outside are plated.

With this, plating layers 30*b* are formed on the surfaces of electrode member 30. Plating layers 30*b* are provided to improve wettability of joining material 97 to wet and spread on the surfaces of side face portion 36 when inductor 100 is mounted on circuit board 99. Moreover, each of plating layers 30*b* includes a material having a relatively large thermal resistance, and therefore plating layer 30*b* is likely to generate heat by laser radiation. Therefore, heat necessary for welding can be easily obtained, and thus weldability is improved.

Adhesion layer 30*c* is a layer formed by adhesive 50. Adhesive 50 hardens after adhesive 50 is disposed, for example, by being applied to a surface of plating layer 30*b* in electrode member 30 (here, the surface in the positive side of the Y-axis direction), and attached to magnetic core 10. After hardening, adhesion layer 30*c*, which is a hardened resin layer of adhesive 50, is formed. Note that adhesive 50 may be applied to magnetic core 10. In this case, before adhesive 50 hardens, electrode member 30 including electrode layer 30*a* and plating layers 30*b* is attached to adhesive 50 on magnetic core 10, and the same configuration as illustrated in the enlarged sectional view of region A1 is obtained after adhesive 50 hardens. Therefore, adhesion layer 30*c* can be regarded as a part of the configuration of magnetic core 10.

Here, in the enlarged sectional view of region A2, adhesion layer 30*c* described above is not present on the surface of electrode member 30. As described with reference to FIG. 5, adhesive 50 is provided corresponding to the first regions. On the other hand, adhesive 50 is not provided to the portion corresponding to the second region. Adhesive 50 mainly includes an organic material. Therefore, if adhesive 50 is present near the base materials at the time of welding, for example, adhesive 50 may be gasified and interfere with welding, as with the above-described insulation film. Therefore, adhesive 50 is not provided in the second region in which welding is to be performed, and thus adhesion layer 30*c* is not formed.

Moreover, as illustrated in the enlarged sectional view of region A2, welded portion 32 reaches the inside of end portion 22 from the outer surface of side face portion 36 in an overlapping direction in which side face portion 36 and end portion 22 overlap each other (in the Y-direction in the figure). The position in end portion 22 where welded portion 32 reaches is adjustable with the output of a laser to be used for welding. If welded portion 32 penetrates through end portion 22 in the overlapping direction in which side face portion 36 and end portion 22 overlap each other, this may cause a crack in end portion 22. On the other hand, if welded portion 32 slightly reaches end portion 22, physical and electric connections will be unstable. Therefore, there is an appropriate range for the position where in end portion 22 welded portion 32 reaches. For example, dimension dii of welded portion 32 formed in end portion 22 in the overlapping direction in which side face portion 36 and end portion 22 overlap each other may be a dimension of at least 10% and at most 90% of total length di of end portion 22 in the overlapping direction in which side face portion 36 and end portion 22 overlap each other. In the example in the figure, dimension dii of welded portion 32 in the overlapping direction in which side face portion 36 and end portion 22 overlap each other is a dimension of 50% of total length di of end portion 22 in the overlapping direction in which side face portion 36 and end portion 22 overlap each other.

Manufacturing Method

Figure 9:
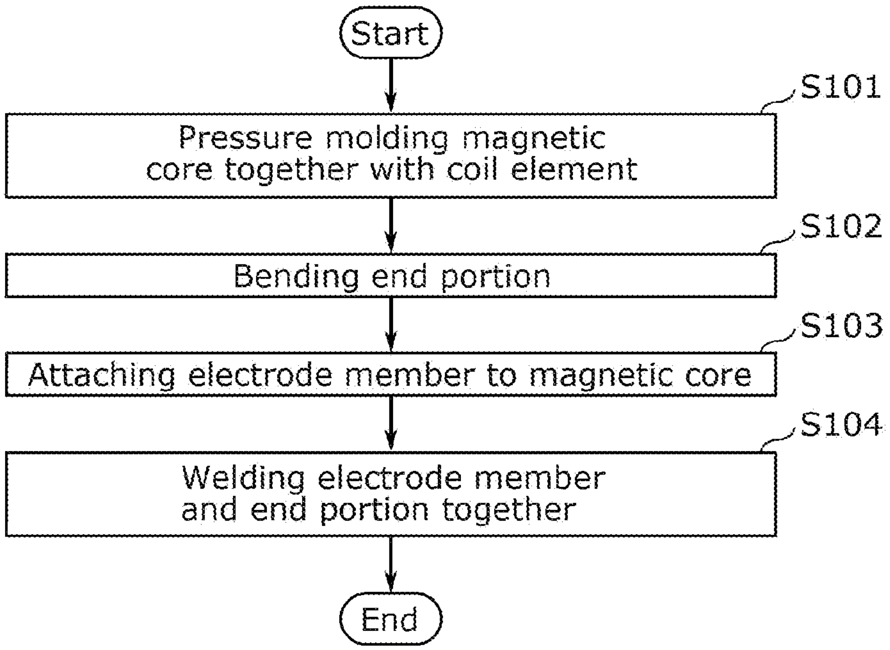
FIG. 9 is a flowchart illustrating a method of manufacturing the inductor according to the embodiment.

Next, a method of manufacturing inductor 100 described above will be described with reference to FIG. 9. FIG. 9 is a flowchart illustrating a method of manufacturing of the inductor according to the embodiment.

In the method of manufacturing inductor 100, first, molding magnetic core 10 by pressure molding (step S101) is performed. This molding of magnetic core 10 is performed by pressure molding a powder magnetic core such that the winding of embedded portion 21 and coil element 20 whose end portions 22 are stretched by preliminary processing are included. After step S101, a step of bending each end portion 22 exposed from magnetic core 10 to extend along a corresponding one of side faces 12 (step S102) is performed. After that, each electrode member 30 is attached to a corresponding one of two side faces 12 (step S103).

After that, a step of welding electrode member 30 and end portion 22 together by lap joint laser welding (step S104) is performed. In this manner, inductor 100 is made in which each electrode member 30 having flexibility is fixed to magnetic core 10 via adhesion layer 30*c* and connected to coil element 20 via welded portions 32. Since this inductor 100 is made by welding end portion 22 and electrode member 30 together after end portion 22 is bent and electrode member 30 is overlapped on end portion 22. Therefore, a crack due to a load applied to the joining material due to a difference in flexible properties between end portion 22 and electrode member 30 will not occur, compared with the method in which end portion 22 and electrode member 30 are bent after end portion 22 and electrode member 30 are joined together. In other words, since end portion 22 and electrode member 30 are bent separately in different steps and then end portion 22 and electrode member 30 are joined together by welding, it is not necessary to consider the differences in the flexible properties.

Moreover, since electrode member 30 is attached to end portion 22 after end portion 22 is bent, electrode member 30 can be accurately attached to end portion 22 after the position of end portion 22 that is bent is checked. Even after electrode member 30 is attached, the relative positions of end portion 22 and electrode member 30 can be estimated highly accurately using non-overlapping portion 22*b*. Subsequently, welded portion 32 that is exposed from electrode member 30 is formed by welding electrode member 30 from outside. This welded portion 32 can be seen from outside of inductor 100, and therefore welding conditions, such as whether the welding is insufficient due to shortage of output, can be estimated from the dimensions, color, shape, etc. of welded portion 32.

As described above, the method of manufacturing inductor 100 according to the present embodiment can ensure the accuracy of aligning end portion 22 of coil element 20 with electrode member 30 and accuracy of welding end portion 22 and electrode member 30 together by a plurality of estimation measures. As a result, an inductor having stably secured electric connection can be manufactured.

Moreover, when inductor 100 that is made is mounted on circuit board 99, magnetic core 10 and electrode member 30 behave integrally as described above. When vibration or the like is applied, stress concentration is alleviated at (i) a part between electrode member 30 fixed to circuit board 99 and magnetic core 10 of inductor 100 and (ii) a part between electrode member 30 and end portion 22, and damage to inductor 100 is inhibited. Therefore, electric connection is maintained. Therefore, inductor 100 that is highly resistant to vibration and highly reliable can be made.

Advantageous Effects, Etc

As described above, inductor 100 according to the present embodiment includes: magnetic core 10 including a magnetic material and having a three-dimensional shape and side face 12; coil element 20 including a metallic material and including embedded portion 21 and end portion 22, embedded portion 21 being embedded in magnetic core 10, end portion 22 exposed from magnetic core 10 and extending along side face 12; and electrode member 30 disposed opposite to magnetic core 10 across end portion 22 of coil element 20, electrode member 30 including a metallic material and having flexibility. Electrode member 30 includes side face portion 36 disposed along side face 12 of magnetic core 10, side face portion 36 at least partially overlapping end portion 22 of coil element 20 as viewed in a thickness direction of side face portion 36. Electrode member 30 and magnetic core 10 are adhered to each other via adhesion layer 30*c* including resin that is adhesive. Electrode member 30 and end portion 22 are welded together at least in a part of a region in which side face portion 36 and end portion 22 overlap each other as viewed in the thickness direction of side face portion 36.

When such inductor 100 is mounted on circuit board 99, magnetic core 10 and electrode member 30 behave integrally. When vibration or the like is applied, stress concentration at (i) a part between electrode member 30 fixed to circuit board 99 and magnetic core 10 of inductor 100 and (ii) a part between electrode member 30 and end portion 22 is alleviated, and damage to inductor 100 is inhibited. Therefore, the electric connection is maintained. In other words, inductor 100 is highly resistant to vibration. Moreover, because electrode member 30 has flexibility, it is possible to form electrode member 30 having a shape that is along the outline of magnetic core 10, and electrode member 30 can be broadly in surface contact with magnetic core 10. Therefore, the electrical connection between electrode member 30 and coil element 20 is more stabilized. In addition, electrode member 30 and coil element 20 are connected to each other by welding without using joining materials, such as solder. Therefore, other joining materials will not be mixed into joining material 97 used when inductor 100 is mounted on circuit board 99. In other words, it is possible to produce an inductor that is more likely to exhibit performance in accordance with the specification because the properties of joining material 97 will not be changed. Therefore, it is possible to produce inductor 100 having a configuration that can stabilize physical and electrical connections in various ways and having higher connection reliability.

Moreover, for example, side face portion 36 of electrode member 30 and end portion 22 may include welded portion 32 where side face portion 36 and end portion 22 are integrated with each other by welding.

With this, electrode member 30 and coil element 20 are connected stably via welded portion 32 formed by welding. A stronger physical connection can be achieved compared with when other joining materials are used, such as soldering. Therefore, inductor 100 having higher connection reliability can be produced.

Moreover, for example, welded portion 32 formed in end portion 22 may have a dimension equal to or less than 90% of a dimension of end portion 22 in an overlapping direction in which side face portion 36 and end portion 22 overlap each other.

With this, electrode member 30 and coil element 20 are connected stably without welded portion 32 penetrating through end portion 22 in the overlapping direction in which side face portion 36 and end portion 22 overlap each other. Therefore, inductor 100 having higher connection reliability can be produced.

Moreover, for example, welded portion 32 formed in end portion 22 may have a dimension equal to or more than 10% of a dimension of end portion 22 in an overlapping direction in which side face portion 36 and end portion 22 overlap each other.

With this, welded portion 32 is formed in a sufficient range in which inductor 100 is less likely to be damaged, and unstable connection is inhibited. In addition, since it is possible to inhibit factors such as direct current resistance caused by faulty connections, the possibility of abnormal heat generation due to energizing is reduced. Therefore, inductor 100 having higher connection reliability can be produced.

Moreover, for example, side face portion 36 of electrode member 30 and end portion 22 may include a plurality of welded portions 32, the plurality of welded portions 32 each being welded portion 32.

With this, welded portions 32 can connect electrode member 30 and coil element 20 more reliably. For example, even when some of welded portions 32 do not form connections between electrode member 30 and coil element 20, if other welded portions 32 form connections between electrode member 30 and coil element 20, inductor 100 can be energized. Moreover, when each of welded portions 32 has the same surface area, the total sectional surface area of electric conductive portions can be increased as the number of welded portions 32 increases. Therefore, factors that cause thermal resistance, such as direct current resistance, can be inhibited, and the possibility of abnormal heat generation due to energizing can be reduced. Therefore, inductor 100 having higher connection reliability can be produced.

Moreover, for example, coil element 20 may include a wire covered with an insulation film, end portion 22 of coil element 20 may include an uncovered portion that is not covered with the insulation film, and electrode member 30 and end portion 22 may be welded together in the uncovered portion.

With this, welding can be performed without an insulating film including an organic material, etc. If an organic material is present during welding, this organic material gasifies and interferes with welding, and causes a welding error. With the above configuration, such a welding error can be avoided, and thus welding can be performed successfully and inductor 100 having higher connection reliability can be produced.

Moreover, for example, electrode member 30 may be a foil material including copper or a copper alloy, and the foil material may have a thickness of at least 20 μm and less than 100 μm.

With this, electrode member 30 that is inexpensive and has a relatively high electric conductivity can be used. In addition, the flexibility of electrode member 30 can be ensured by the thickness of the material. Due to the high electric conductivity described above, a sufficient energizing performance can be maintained even with such a foil material. As a result, a high-performance inductor 100 with low manufacturing cost can be produced.

Moreover, for example, electrode member 30 may include plating layer 30*b* having a surface on which tin or solder is plated.

With this, electrode member 30 that joining material 97 easily wets and spreads on when inductor 100 is mounted on circuit board 99 can be formed. Therefore, inductor 100 that is easily mounted can be produced. In addition, since a material having high thermal resistance is selected as the material used for plating layer 30*b*, the melting temperature can be easily obtained in laser welding, and electrode member 30 and coil element 20 can be easily welded. Therefore, inductor 100 can be easily made and easily mounted on circuit board 99.

Moreover, for example, end portion 22 may include non-overlapping portion 22*b* in which end portion 22 does not overlap side face portion 36 of electrode member 30 as viewed in the thickness direction of side face portion 36.

With this, the position of overlapping portion 22*a* can be estimated from the position of non-overlapping portion 22*b*, for example. The estimated position of overlapping portion 22*a* can be used, for example, for fine adjustment of the part to be welded before welding and for identification of welding anomalies after welding. As a result, welding can be performed properly, and inductor 100 having high connection reliability can be made.

Moreover, for example, side face 12 of magnetic core 10 may include recess 12*a* and base 12*b*. Recess 12*a* is recessed toward inside magnetic core 10. Base 12*b* is a portion of side face 12 excluding recess 12*a*. End portion 22 may include: a first part that is housed in recess 12*a*; and a second part that protrudes in a direction away from magnetic core 10 to a position farther than base 12*b* by at least 5.00 μm and at most 100 μm as viewed in a direction perpendicular to the thickness direction of side face portion 36.

With this, when electrode member 30 is attached to side face 12 with adhesive 50, electrode member 30 is pushed toward the surface of end portion 22 of coil element 20 that protrudes from base 12*a* of side face 12 and an electrode recess is formed, and end portion 22 and electrode member 30 come into contact with each other. Welding is performed after end portion 22 and electrode member 30 are in such a contact state. Therefore, for example, this reduces the possibility of welding errors due to the presence of air between electrode member 30 and end portion 22. Therefore, welding can be performed properly, and inductor 100 having higher connection reliability can be produced.

Moreover, for example, the second part of end portion 22 may have a curved shape that protrudes in the direction away from magnetic core 10 as viewed in the direction perpendicular to the thickness direction of side face portion 36.

With this, when electrode member 30 is attached to side face 12 with adhesive 50, electrode member 30 and end portion 22A can be more easily brought into surface contact with each other compared with the above-described aspect. As a result, the possibility of welding errors due to the presence of air between electrode member 30 and the end portion is further reduced.

Moreover, for example, a radius of curvature of the curved shape of the second part may decrease with increasing distance along the curved shape from a position in the curved shape at which a distance from magnetic core 10 is farthest.

With this, when electrode member 30 is attached to side face 12 with adhesive 50, electrode member 30 and end portion 22A can be even more easily brought into surface contact with each other compared with the above-described aspect. As a result, the possibility of a welding error due to the presence of air between electrode member 30 and the end portion is even further reduced.

Moreover, for example, the three-dimensional shape of magnetic core 10 may include top face 14 intersecting side face 12, and electrode member 30 may include top face portion 33 that is disposed along top face 14, connected to side face portion 36, and adhered to magnetic core 10 via adhesion layer 30*c*.

With this, electrode member 30 and magnetic core 10 are also adhered to each other at top face portion 33, which extends and intersects side face portion 36. Three-dimensional adhesion with two or more intersecting surfaces provides a more stable connection between electrode member 30 and magnetic core 10. In addition, the detachment of magnetic core 10 toward top face 14, which is difficult to suppress with only side face portion 36, can be suppressed from the top face 14 side. Therefore, the physical connection between electrode member 30 and magnetic core 10 is stabilized. As a result, physical connection is stabilized between electrode member 30 and coil element 20 which is partially embedded in and fixed to magnetic core 10. Consequently, electric connection between coil element 20 and electrode member 30 is stably maintained. Therefore, inductor 100 having higher connection reliability can be produced.

Moreover, for example, the three-dimensional shape of magnetic core 10 may include bottom face 13 intersecting side face 12 and parallel to top face 14, and electrode member 30 may include bottom face portion 34 disposed along bottom face 13 and connected to side face portion 36.

With this, magnetic core 10 and electrode member 30 are in contact with each other on side face 12 and bottom face 13 that intersects side face 12. Since magnetic core 10 and electrode member 30 are in contact with each other three-dimensionally, changes in the positional relation such as unsteadiness are less likely to occur. Therefore, since the positional relation between coil element 20 and electrode member 30 is less likely to change because coil element 20 is partially embedded in and fixed to magnetic core 10, the connection reliability improves between electrode member 30 and coil element 20. In addition, the contact area that is in contact with land 98 on the circuit board on which inductor 100 is mounted can be expanded. Therefore, inductor 100 having higher connection reliability can be produced.

Moreover, for example, a surface area of a principal face of top face portion 33 along top face 14 may be smaller than a surface area of a principal face of bottom face portion 34 along bottom face 13.

With this, when inductor 100 is sucked and held by nozzle suction and moved to a predetermined land 98 on circuit board 99, a wide flat face can be secured for suction. Therefore, since various suction nozzles can be applied, it is possible to produce inductor 100 that can be easily mounted on circuit board 99.

Other Embodiments, Etc

The inductor according to the embodiment, etc. of the present disclosure has been described above, but the present disclosure is not limited to the embodiment.

For example, electric products or electric circuits including the inductors described above are also included in the present disclosure. Examples of electrical products include power supply devices including the inductors described above and various devices including such power supply devices.

Moreover, the present disclosure is not limited to the embodiment described above. Various modifications to the embodiment as well as embodiments resulting from arbitrary combinations of structural elements of different embodiments that may be conceived by those skilled in the art are intended to be included within the one or more aspects of the present disclosure as long as they do not depart from the essence of the present disclosure.

INDUSTRIAL APPLICABILITY

The inductors according to the present disclosure are useful as inductors to be used in various kinds of apparatuses and devices, for example.

REFERENCE SIGNS LIST

10, 10*x* magnetic core
11, 12 side face
12*a* base
12*b* recess
13 bottom face
14 top face
20, 20*x* coil element
21, 21*x* embedded portion
22, 22*x*, 22A end portion
22*a* overlapping portion
22*b* non-overlapping portion
30, 30*x* electrode member
30*a* electrode layer
30*b* plating layer
30*c* adhesion layer
32 welded portion
33 top face portion
34 bottom face portion
34*x* bottom plate
36 side face portion
36*x* side plate
50 adhesive
97 joining material
98 land
99 circuit board
100, 100*x*, 100A inductor

The invention claimed is:

1. An inductor comprising:

a magnetic core including a magnetic material and having a three-dimensional shape and a side face;

a coil element including a metallic material and including an embedded portion and an end portion, the embedded portion being embedded in the magnetic core, the end portion exposed from the magnetic core and extending along the side face; and an electrode member disposed opposite to the magnetic core across the end portion of the coil element, the electrode member including a metallic material and having flexibility, wherein the electrode member includes a side face portion disposed along the side face of the magnetic core, the side face portion at least partially overlapping the end portion of the coil element as viewed in a thickness direction of the side face portion, the electrode member and the magnetic core are adhered to each other via an adhesion layer including resin that is adhesive, and the electrode member and the end portion are welded together at least in a part of a region in which the side face portion and the end portion overlap each other as viewed in the thickness direction of the side face portion, wherein the side face of the magnetic core includes a recess and a base, the recess being recessed toward inside the magnetic core, the base being a portion of the side face excluding the recess, and the end portion includes:

a first part that is housed in the recess; and a second part that protrudes in a direction away from the magnetic core to a position farther than the base by at least 5.00 μm and at most 100 μm as viewed in a direction perpendicular to the thickness direction of the side face portion.

2. The inductor according to claim 1, wherein the side face portion of the electrode member and the end portion include a welded portion where the side face portion and the end portion are integrated with each other by welding.

3. The inductor according to claim 2, wherein the welded portion formed in the end portion has a dimension equal to or less than 90% of a dimension of the end portion in an overlapping direction in which the side face portion and the end portion overlap each other.

4. The inductor according to claim 2, wherein the welded portion formed in the end portion has a dimension equal to or more than 10% of a dimension of the end portion in an overlapping direction in which the side face portion and the end portion overlap each other.

5. The inductor according to claim 2, wherein the side face portion of the electrode member and the end portion include a plurality of welded portions, the plurality of welded portions each being the welded portion.

6. The inductor according to claim 1, wherein the coil element includes a wire covered with an insulation film, the end portion of the coil element includes an uncovered portion that is not covered with the insulation film, and the electrode member and the end portion are welded together in the uncovered portion.

7. The inductor according to claim 1, wherein the electrode member is a foil material including copper or a copper alloy, and the foil material has a thickness of at least 20 μm and less than 100 μm.

8. The inductor according to claim 1, wherein the electrode member includes a plating layer having a surface on which tin or solder is plated.

9. The inductor according to claim 1, wherein the end portion includes a non-overlapping portion in which the end portion does not overlap the side face portion of the electrode member as viewed in the thickness direction of the side face portion.

10. The inductor according to claim 1, wherein the three-dimensional shape of the magnetic core includes a top face intersecting the side face, and the electrode member includes a top face portion that is disposed along the top face, connected to the side face portion, and adhered to the magnetic core via the adhesion layer.

11. The inductor according to claim 10, wherein the three-dimensional shape of the magnetic core includes a bottom face intersecting the side face and parallel to the top face, and the electrode member includes a bottom face portion disposed along the bottom face and connected to the side face portion.

12. The inductor according to claim 11, wherein a surface area of a principal face of the top face portion along the top face is smaller than a surface area of a principal face of the bottom face portion along the bottom face.

13. An inductor comprising:

a magnetic core including a magnetic material and having a three-dimensional shape and a side face;

a coil element including a metallic material and including an embedded portion and an end portion, the embedded portion being embedded in the magnetic core, the end portion exposed from the magnetic core and extending along the side face; and an electrode member disposed opposite to the magnetic core across the end portion of the coil element, the electrode member including a metallic material and having flexibility, wherein the electrode member includes a side face portion disposed along the side face of the magnetic core, the side face portion at least partially overlapping the end portion of the coil element as viewed in a thickness direction of the side face portion, the electrode member and the magnetic core are adhered to each other via an adhesion layer including resin that is adhesive, and the electrode member and the end portion are welded together at least in a part of a region in which the side face portion and the end portion overlap each other as viewed in the thickness direction of the side face portion, wherein the side face of the magnetic core includes a recess and a base, the recess being recessed toward inside the magnetic core, the base being a portion of the side face excluding the recess, and the end portion includes:

a first part that is housed in the recess; and a second part that protrudes in a direction away from the magnetic core to a position farther than the base by at least 5.00 μm and at most 100 μm as viewed in a direction perpendicular to the thickness direction of the side face portion, and wherein the second part of the end portion has a curved shape that protrudes in the direction away from the magnetic core as viewed in the direction perpendicular to the thickness direction of the side face portion.

14. An inductor comprising:

a magnetic core including a magnetic material and having a three-dimensional shape and a side face;

a coil element including a metallic material and including an embedded portion and an end portion, the embedded portion being embedded in the magnetic core, the end portion exposed from the magnetic core and extending along the side face; and an electrode member disposed opposite to the magnetic core across the end portion of the coil element, the electrode member including a metallic material and having flexibility, wherein the electrode member includes a side face portion disposed along the side face of the magnetic core, the side face portion at least partially overlapping the end portion of the coil element as viewed in a thickness direction of the side face portion, the electrode member and the magnetic core are adhered to each other via an adhesion layer including resin that is adhesive, and the electrode member and the end portion are welded together at least in a part of a region in which the side face portion and the end portion overlap each other as viewed in the thickness direction of the side face portion, wherein the side face of the magnetic core includes a recess and a base, the recess being recessed toward inside the magnetic core, the base being a portion of the side face excluding the recess, and the end portion includes:

a first part that is housed in the recess; and a second part that protrudes in a direction away from the magnetic core to a position farther than the base by at least 5.00 μm and at most 100 μm as viewed in a direction perpendicular to the thickness direction of the side face portion, wherein the second part of the end portion has a curved shape that protrudes in the direction away from the magnetic core as viewed in the direction perpendicular to the thickness direction of the side face portion, wherein a radius of curvature of the curved shape of the second part decreases with increasing distance along the curved shape from a position in the curved shape at which a distance from the magnetic core is farthest.

* * * * *